United States Patent

Hisano et al.

[11] Patent Number: 5,902,676
[45] Date of Patent: May 11, 1999

[54] COATING TYPE MAGNETIC RECORDING MEDIUM HAVING A MULTILAYER STRUCTURE

[75] Inventors: Seiichi Hisano, Chiba; Kazuhisa Saito, Okayama; Kazushi Sano, Okayama; Shinichi Konno, Okayama; Yoshichika Horikawa, Okayama; Yasuhiko Aihara, Okayama, all of Japan

[73] Assignee: Dowa Mining Co., Ltd., Tokyo, Japan

[21] Appl. No.: 08/917,921

[22] Filed: Aug. 27, 1997

[30] Foreign Application Priority Data

Aug. 27, 1996 [JP] Japan .................................. 8-242544

[51] Int. Cl.⁶ .................................................. B32B 5/16
[52] U.S. Cl. .......................... 428/323; 428/328; 428/329; 428/332; 428/694 BS; 428/694 TS; 428/900
[58] Field of Search .................... 428/323, 328, 428/329, 332, 694 BS, 694 BM, 694 TS, 900

[56] References Cited

U.S. PATENT DOCUMENTS

| 5,546,622 | 8/1996 | Isobe et al. | 428/216 |
| 5,587,232 | 12/1996 | Hayashi et al. | 428/323 |
| 5,604,015 | 2/1997 | Hayashi et al. | 428/144 |
| 5,637,390 | 6/1997 | Isobe et al. | 428/323 |

*Primary Examiner*—Elizabeth Evans
*Attorney, Agent, or Firm*—McDermott, Will & Emery

[57] ABSTRACT

A coating type magnetic recording medium having a multilayer structure exhibits excellent strength, surface smoothness, and weather resistance is formed on a substrate, and comprises a magnetic layer of magnetic particles dispersed in a resinous binder, and a non-magnetic layer of non-magnetic particles dispersed in a resinous binder. The magnetic particles are composed of acicular ferromagnetic metal particles of Fe containing Co, Al, rare earth elements, periodic table group 1a and 2a elements. The non-magnetic particles are composed of acicular particles of α-FeOOH.

6 Claims, 2 Drawing Sheets

COATING TYPE MAGNETIC RECORDING MEDIUM HAVING A MULTILAYER STRUCTURE

BACKGROUND OF THE INVENTION

1. Field of the Invention

The present invention relates to a coating type magnetic recording medium having a multilayer structure.

2. Description of the Prior Art

In a coating-type magnetic recording medium composed of a magnetic layer formed on a substrate by coating the substrate with a coating film of magnetic particles dispersed in a binder resin, it is desirable for the magnetic layer to have a smaller thickness to obtain low-noise, high-output characteristics. To accomplish this, coating type magnetic recording media having a multilayer structure have been proposed comprising forming between the magnetic layer and the substrate a non-magnetic coating layer obtained by dispersing non-magnetic particles in a binder resin. In this specification, the non-magnetic layer is also referred to as "lower layer" and the magnetic layer as "upper layer."

As the non-magnetic particles used to form the lower layer, there are mainly used spherical particles of titanium oxide or acicular particles of iron oxide. This type of multilayer magnetic recording medium is described in, for example, Japanese Patent Application Laid-Open (KOKAI) No. 63-187418 (1988), Japanese Patent Application Laid-Open (KOKAI) No. 4-167225 (1992) Japanese Patent Application Laid-Open (KOKAI) No. 6-60362 (1994) and Japanese Patent Application Laid-Open (KOKAI) No. 6-131653 (1994). It is also proposed in Japanese Patent Application Laid-Open (KOKAI) No. 4-167225 (1992), Japanese Patent Application Laid-Open (KOKAI) No. 6-139553 (1994), Japanese Patent Application Laid-Open (KOKAI) No. 6-215360 (1994), Japanese Patent Application Laid-Open (KOKAI) No. 7-78331 (1995), Japanese Patent Application Laid-Open (KOKAI) No. 7-105530 (1995), Japanese Patent Application Laid-Open (KOKAI) No. 7-182649 (1995), Japanese Patent Application Laid-Open (KOKAI) No. 7-282443 (1995), Japanese Patent Application Laid-Open (KOKAI) No. 7-326037 (1995) and Japanese Patent Application Laid-Open (KOKAI) No. 7-334835 (1995), among others. These describe characteristic values obtained when acicular hematite and the like are employed as the non-magnetic particles of the lower layer. That iron oxide hydrate and the like can be used for the lower layer is also stated, but characteristic values thereof are not included.

With respect to a magnetic recording medium having a multilayer structure, there is no actual record of FeOOH particles being used for the lower layer, neither do the above publications describe any specific examples or properties relating to when FeOOH particles are used for the lower layer. As such, there are many unknowns concerning which iron oxide hydrate will exhibit the intended functions when used as the particles of the lower layer of a magnetic recording medium. FeOOH is usually produced by oxidizing a suspension of $Fe(OH)_2$, but it is well known than even slight variation in oxidizing conditions can result in different phases, and differences in properties and morphology. Clearly, therefore, not all known iron oxide hydrates have the right properties for use as lower layer particles.

The magnetic upper layer of a magnetic recording medium having a multilayer structure is required to be as thin as possible and to have a high density. This means that the magnetic particles have to be finer and have superior magnetic properties, and have excellent dispersibility so as not to degrade the resinous binder. When suitably combined with the lower layer, it is also required for the product medium to have excellent strength, storage-stability and weather resistance, and excellent surface smoothness, while retaining the excellent magnetic qualities.

For applying FeOOH to form the particles used in the lower layer to obtain a magnetic recording medium having a multilayer structure that exhibits excellent magnetic properties, surface qualities, strength, weather resistance and so forth, in accordance with the present invention, it was necessary to clarify what effect the chemical and physical properties and shape of the particles would have on the surface smoothness, strength, magnetic properties, and weather resistance of the magnetic recording medium, and what were the most suitable magnetic particles for the upper layer that is combined with the lower layer.

SUMMARY OF THE INVENTION

According to the present invention is provided a coating type magnetic recording medium having a multilayer structure, formed on a substrate, comprising a magnetic layer of magnetic particles dispersed in a resinous binder, and a non-magnetic layer of non-magnetic particles dispersed in a resinous binder, said magnetic particles being composed of acicular ferromagnetic metal particles of Fe containing from more than 5 to 50 at. % Co, 0.1 to 30 at. % Al, 0.1 to 10 at. % rare earth elements (including Y), up to 0.05 wt. % periodic table group 1a elements and up to 0.1 wt. % (including 0 wt. %) periodic table group 2a elements, said non-magnetic particles being composed of acicular particles of α-FeOOH having an average major axis diameter of 0.01 to 0.5 μm and releasing not more than 2 wt. % of $H_2O$ at 100° C.

The above and other features of the invention will be better understood from the following description made with respect to the drawings.

DETAILED DESCRIPTION OF THE INVENTION

Figure 1:
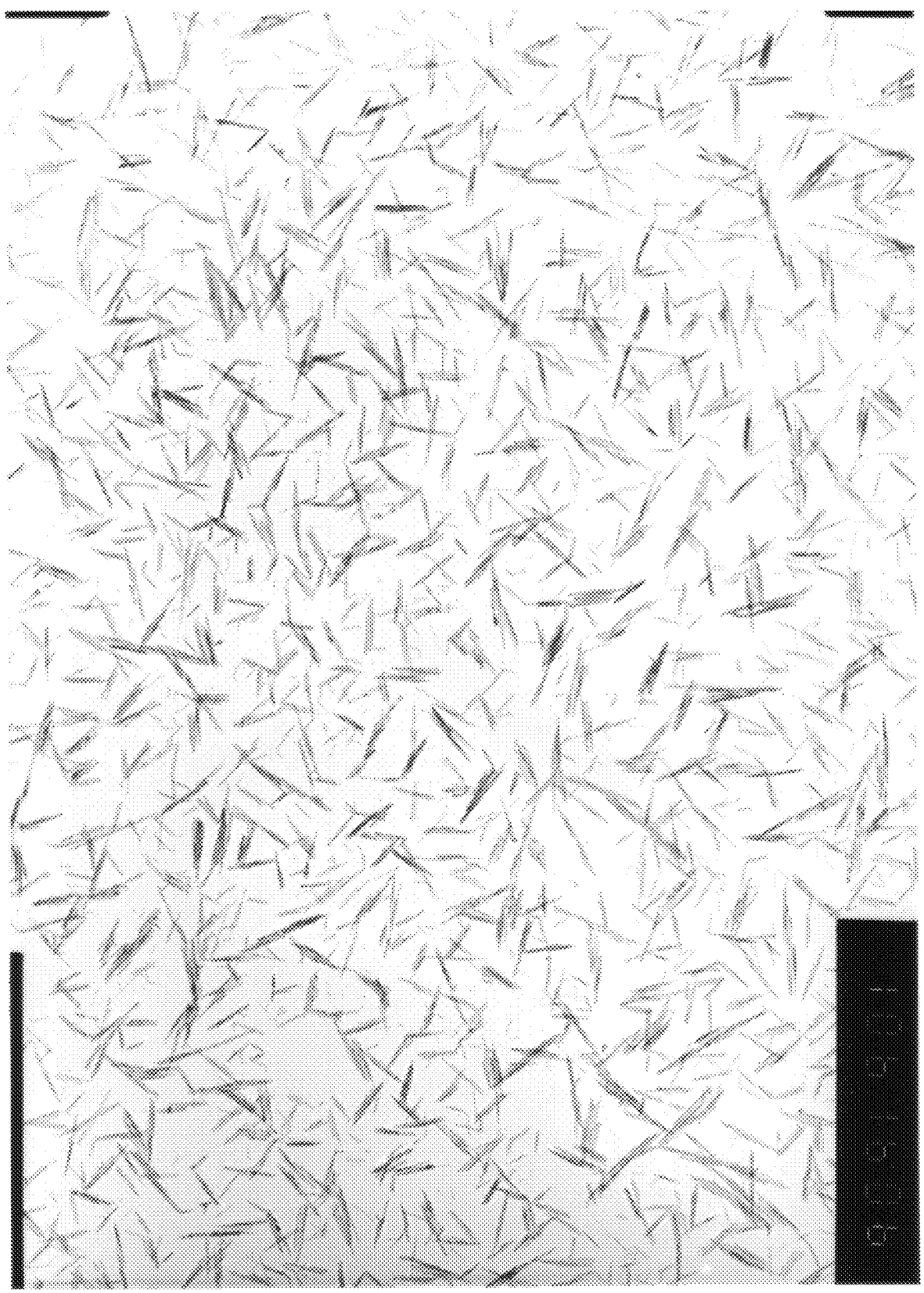
FIG. 1 is an electron microphotograph showing the shapes (branching) of the individual acicular particles of α-FeOOH of the lower layer, in accordance with the present invention.

The aim of providing a non-magnetic lower layer of a dispersion of non-magnetic particles between the substrate and the magnetic layer is to reduce the thickness of the magnetic layer while ensuring output in short-wavelength recording regions, and to obtain improved electromagnetic conversion characteristics such as erase and overwrite characteristics. To achieve this, the magnetic layer itself has to have the requisite properties. These requirements are satisfied by the magnetic particles according to the present invention. Before describing these magnetic particles, the lower layer particles that enable these properties to be obtained will be described.

First, with respect to the non-magnetic particles used for the lower layer, the role of the non-magnetic lower layer in the coating type magnetic recording medium having a multilayer structure includes being able to be coated on the thin magnetic layer with a smooth surface having few non-uniformities, that is, the non-magnetic layer itself has to have good surface smoothness, imparting strength to the magnetic recording medium, and adequately bringing out the magnetic properties of the magnetic upper layer.

When granular particles of titanium oxide that have been used as lower layer particles were formed into a tape, the strength thereof was insufficient compared to acicular particles, and it was difficult to make the particles finer. In the case of acicular hematite, with the production method used it is impossible to prevent sintering of the particles, so that sufficient surface smoothness cannot be obtained.

When forming a coating film of α-FeOOH dispersed in a resinous binder, depending on the binder, the chemical and physical qualities as well as the dimensions and shape of the α-FeOOH particles can have a major bearing on surface smoothness, strength and other such properties. It was found that acicular α-FeOOH particles that have an average major axis diameter of 0.01 to 0.5 μm and release not more than 2 wt. % of $H_{20}$ at 100° C. can be used to form a lower layer having the required surface smoothness and strength, and improve the qualities of the magnetic layer.

Moreover, the lower layer can perform the required functions more advantageously when the α-FeOOH particles are acicular particles with branches inclined in a two-dimensional direction and an average major axis diameter of 0.01 to 0.5 μm, and release not more than 2 wt. % of $H_2O$ at 100° C.

The above functions can be performed more advantageously when the α-FeOOH particles are acicular particles that contain 0.1 to 30 percent by weight Al, have an average major axis diameter of 0.01 to 0.5 μm, and release not more than 2 wt. % of $H_2O$ at 100° C.

The above functions can also be performed more advantageously when the α-FeOOH particles are acicular particles that contain 0.1 to 30 percent by weight Si, have an average major axis diameter of 0.01 to 0.5 μm and release not more than 2 wt. % of $H_2O$ at 100° C.

The above functions can also be performed more advantageously when the α-FeOOH particles are acicular particles that contain a combined total of 0.1 to 30 percent by weight of Al and Si, have an average major axis diameter of 0.01 to 0.5 μm and release not more than 2 wt. % of $H_2O$ at 100° C.

The above functions can also be performed more advantageously when the α-FeOOH particles are acicular particles having an average major axis diameter of 0.01 to 0.5 μm, a TAP density of 0.4 or more and release not more than 2 wt. % of $H_2O$ at 100° C.

The above functions can also be performed more advantageously when the α-FeOOH particles are acicular particles that have an average major axis diameter of 0.01 to 0.5 μm, contain 0.1 to 30 percent by weight Al, have an atmospheric decomposition temperature of 210° C. or higher, preferably 215° C. or higher, and release not more than 2 wt. % of $H_2O$ at 100° C.

In addition to the above properties, it is also desirable for the α-FeOOH particles of the present invention to have the following properties.

A BET specific surface area that is within the range 10 to 300 $m^2/g$, preferably 40 $m^2/g$ or more, and more preferably 40 to 150 $m^2/g$; a TAP density of 0.3 to 0.8 $g/cm^3$, preferably 0.40 $g/cm^3$ or more; a compression density of 0.5 to 3.0 $g/cm^3$, preferably 1.0 to 2.0 $g/cm^3$; and a true specific gravity of 3.0 to 6.0 $g/cm^3$, preferably 3.5 to 4.3 $g/cm^3$. The high TAP density and compression density relative to the true specific gravity facilitates compression of the particles in the coating film during the calendering step of the tape formation process, which has the effect of improving the surface smoothness of the tape.

A crystalline diameter of 10 to 200 angstrom, preferably 50 to 150 angstrom.

Thus, it is desirable that, in size, the α-FeOOH particles have an average major axis diameter of 0.01 to 0.5 μm, an average minor axis diameter of 0.01 to 0.05 μm, an average aspect ratio of 1 to 30, a specific surface area of 10 to 300 $m^2/g$, and a crystalline diameter of 10 to 200 angstrom. The fineness of these particles, especially their small minor axis diameter, results in a smoother tape surface, while the crystalline diameter and specific surface area reflects the major axis diameter.

The surface treatment condition and pH of the α-FeOOH particles also have an influence on the dispersibility when forming the coating material, and therefore also affect the surface smoothness. Favorable ranges for these are as follows; it is desirable to adjust the values to within these ranges. Amount of stearic acid adsorption: 0.1 to 3.0 $mg/m^2$.

Amount of resin adsorption: 0.5 to 4.0 $mg/m^2$. pH: A particle pH of 6 to 11, preferably 8 to 10, more preferably 8.0 to 9.5. Adjusting to this pH improves dispersibility when forming the coating material, and serves to improve the surface smoothness.

The particles for the lower layer according to this invention can be obtained by the method generally used to produce α-FeOOH. One such process comprises, for example, producing the particles by oxidizing a suspension containing colloidal ferrous hydroxide particles and having a pH of not less than 11, which is obtained by adding not less than an equivalent of an alkali hydroxide solution to an aqueous salt solution, by passing an oxygen-containing gas thereinto at a temperature not higher than 80° C., followed by drying and moisture-conditioning, while another such process comprises producing the particles by oxidizing a suspension obtained by reacting an aqueous ferrous salt solution with an aqueous alkali carbonate solution, by passing an oxygen-containing gas thereinto, followed by drying and moisture-conditioning. Unlike in the production of hematite particles, α-FeOOH particles obtained by such a method are not subjected to a high-temperature treatment step, so a problem of particles sintering together does not arise.

FIG. 1 is a transmission electron microphotograph of α-FeOOH particles according to the present invention, with a major axis diameter of 0.30 μm, Al content of 2.8 wt. %, and a specific surface area (BET) of 65 $m^2/g$. As revealed by FIG. 1, the particles have branches with an inclination parallel to the drawing sheet. This can be seen from the fact that even when a particle has three or more branches, the angles of the branches appear substantially uniform. If most of the components were normal to the plane of the drawing sheet, the branching angles would have appeared to be sharper. The fact that even with respect to particles that have a plurality of branches each of the branches is inclined in a two-dimensional direction in a specific plane, contributes to the surface smoothness of a lower layer in which the particles are used. This is because when the coating is applied, there are few branch components perpendicular to the substrate plane. Mutual twining of the branches also serves to improve the strength of the tape.

An especially smooth surface is obtained when the particles dispersed in the resin binder coated on the substrate have a major axis diameter of not more than 0.5 μm. As can also be seen in FIG. 1, the fine acicular α-FeOOH particles are characterized by having a high aspect ratio resulting from the very fine minor axis diameter, resulting during the coating in good orientation in the longitudinal direction of the tape (the branches also being oriented in this direction), improving the strength of the tape as well as the surface smoothness.

Providing the $\alpha$-FeOOH with a suitable Al content improves the heat resistance and storage-stability. With an Al content of 0.1 to 30 wt. %, the $\alpha$-FeOOH particles can be stably maintained without undergoing change even when the temperature is being lowered during the drying step of tape formation. The effect provided by the Al is insufficient when the Al content is less than 0.1 wt. %. An Al content that exceeds 30 wt. % increases the specific surface area of the particles, degrading the dispersibility. With respect to when Al is contained as a compound, the Al content as used herein refers not to the content of the compound but to the content of just the element Al. The Al content may be Al occluded within the $\alpha$-FeOOH or Al cladding on the surface.

The Al may be contained in the $\alpha$-FeOOH in the form of a water-soluble salt such as $Al_2(SO_4)_3$, $Al(NO_3)_3$ and $AlCl_3$, or a water-soluble aluminate compound such as $NaAlO_2$ (sodium aluminate). An Al compound can be used to clad the surface of the $\alpha$-FeOOH with Al by, for example, dissolving the Al compound in an alkaline solution, dispersing the $\alpha$-FeOOH in the solution, neutralizing the solution by blowing carbonic gas into the solution or by adding an acid, thereby cladding the surface of the particles with Al in the form of crystalline or amorphous $Al_2O_3 \cdot nH_2O$ (aluminum hydroxide). The Al can be occluded within the $\alpha$-FeOOH particles by adding the water-soluble Al salt or aluminate to the reaction system used to produce$\alpha$-FeOOH and the like by using a neutralizer such as $NaOH$, $Na_2CO_3$, or $NH_4OH$ to neutralize a ferrous salt solution such as a solution of $FeSO_4$ or $FeCl_2$ and then oxidizing the solution in air, for example.

The surface quality of the particles according to the present invention may also be controlled by using other elements such as a Si compound. The content range in the case of Si is 0.1 to 30 wt. %. When Al and Si are both used, the combined total content should be within the range 0.1 to 30 wt. %. With respect to when Si is contained as a compound, the Si content as used herein refers not to the content of the compound but to the content of just the element Si.

Figure 2:
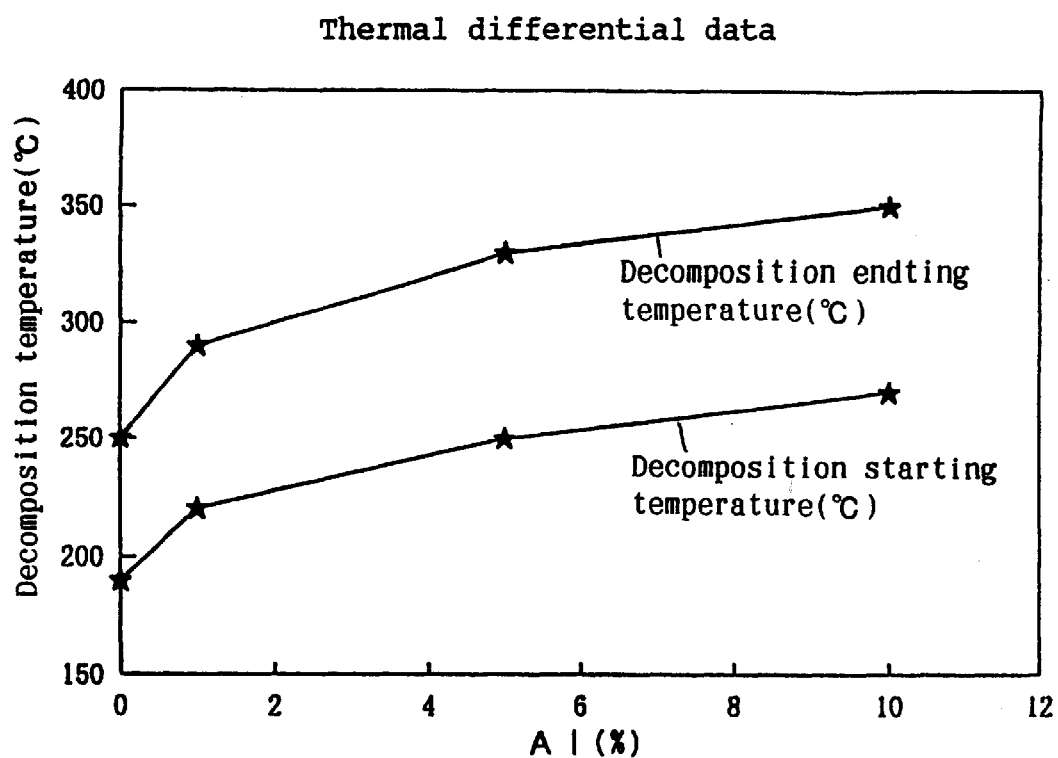
FIG. 2 is a graph showing the relationship between the Al content and the decomposition temperature of the α-FeOOH.

It was found that the temperature at which the $\alpha$-FeOOH when heated would decompose in air varied depending on the Al content of the $\alpha$-FeOOH. FIG. 2 shows the relationship between the temperature at which decomposition began and ended plotted and the Al content (wt. %) of the $\alpha$-FeOOH. The decomposition temperatures were measured using a differential thermal analyzer that complies with JIS K7120. The curves that join the stars in FIG. 2 were deduced from plots of measured values. It can be seen from these curves that the temperatures at which $\alpha$-FeOOH decomposition starts and ends rise with the increase in the Al content. Typical values of the curves are shown in the following table.

| Al content of $\alpha$-FeOOH (wt. %) | Decomposition starting temperature | Decomposition ending temperature |
|---|---|---|
| 0 | 190° C. | 250° C. |
| 1 | 220 | 290 |
| 5 | 250 | 330 |
| 10 | 270 | 350 |

The properties of the lower layer are affected by the moisture amount of the $\alpha$-FeOOH. The amount of moisture released when the $\alpha$-FeOOH is maintained at 100° C. must not exceed 2 wt. %, and preferably does not exceed 1.5 wt. %. If the amount of moisture released at 100° C. is more than 2 wt. %, the dispersibility in the binder resin will be insufficient, and even if coating is effected, implementing a tape is difficult. This moisture amount can be measured using the moisture measurement principle according to the Carl Fischer method. An example is shown below.

| Al content of $\alpha$-FeOOH particles (wt. %) | Major axis diameter of $\alpha$-FeOOH particles ($\mu$m) | Amount of moisture released (wt. %) | |
|---|---|---|---|
| | | 100° C. | 160° C. |
| 2.8 | 0.30 | 1.09 | 1.84 |
| 4.3 | 0.15 | 0.76 | 1.45 |

Specific effects resulting from the use of $\alpha$-FeOOH for the particles of the lower layer of the magnetic recording medium having a multilayer structure according to the present invention will now be shown, with reference to test examples.

We begin by describing the methods used to measure the values of properties shown in the test examples. The same measurement methods are also used for the examples described later. The average major axis diameter (denoted by I in the tables), average minor axis diameter (denoted by d), and aspect ratio (I/d) are average values obtained from measuring 100 particles in electron microphotographs that show the particles magnified 108,000 times in the case of lower layer particles, and 174,000 times in the case of upper layer magnetic metal particles. The crystalline diameter (denoted by Dx) was calculated by obtaining the peak half width corresponding to the (110) plane from a profile obtained with an x-ray diffraction apparatus, and substituting this into a Scherrer formula.

The specific surface area (denoted by BET) was measured using the BET method. The stearic acid adsorption amount (denoted by STA or St. adsorption amount) was calculated as the adsorption amount per specific surface area obtained by dispersing sample particles in a 2% MEK solution of stearic acid, centrifuging the solution to cause the particles to settle and measuring the concentration of the clear upper layer. The amount of resin adsorption (denoted by Resin) was calculated by the same method, using a 2% MIBK solution of polyurethane resin.

The pH was measured according to JIS K5101. The true specific gravity was measured by the immersion method, using toluene as the solvent. The compression density (denoted by CD) is the density of the sample compressed at a pressure of 80 kgf/cm$^2$. The TAP density (denoted by TAP) was measured according to JIS K5101. Particle moisture related measurements were based on changes in weight at 100° C. (or 300° C.) in accordance with the Carl Fischer method. Decomposition starting and ending temperatures were obtained from thermal differential data. Moisture amount based changes in viscosity were obtained when the particles were dispersed in the coating material by using an E type viscometer to measure the viscosity of the coating material. The surface smoothness was evaluated based on the surface roughness Ra of the base layer surface of the tape, as measured using a three-dimensional fine shape measuring machine (model ET-30HK) manufactured by Kabushiki Kaisha Kosaka Laboratory.

Also in the tables,

Hc is coercive force (Oe);

$\sigma S$ is saturation magnetic flux density of magnetic metal particles (emu/g);

$\sigma r$ is residual magnetic flux density of magnetic metal particles (emu/g);

Br is residual magnetic flux density of tape (gauss);

Bm is saturation magnetic flux density of tape (gauss);

$\sigma r/\sigma s$ and Br/Bm are remanence ratios;

$\Delta \sigma s$ and $\Delta Bm$ are the ratios of decrease (%) in $\sigma s$ and Bm after one week in an atmosphere at 60° C. and a relative humidity (RH) of 90%.

The presence or absence of precipitates following weather resistance tests refers to whether or not precipitates are observed on the tape surface after one week in an atmosphere at 60° C. and a relative humidity (RH) of 90%, said observation being by means of a microscope. A Hi-8 video deck was used to measure the electromagnetic conversion characteristics.

Lower Layer Particle Test Examples

Lower layer example 1

Coating material having the following composition was prepared.

| | |
|---|---|
| α-FeOOH | 100 parts by weight |
| (In this example, | |
| the major axis diameter | |
| was 0.15 µm and | |
| moisture amount at | |
| 100° C. was 1 wt. %.) | |
| Polyurethane resin | 20 parts by weight |
| Methyl ethyl ketone | 165 parts by weight |
| Cyclohexanon | 65 parts by weight |
| Toluene | 165 parts by weight |
| Stearic acid | 1 part by weight |
| Acetyl acetone | 1 part by weight |

Coating material having the above composition obtained after dispersion for one hour using a centrifugal ball mill was applied with an applicator to a polyethylene terephthalate base film to a target thickness of approximately 3 µm to form a non-magnetic lower layer. The properties of the α-FeOOH used and of the lower layer thus obtained are listed in Table 1-A and Table 1-B (these values of the following examples and comparative examples are also listed in Table 1-A and 1-B).

Lower layer example 2

A lower layer was produced in the same way as in example 1 except that instead of the α-FeOOH particles having a major axis diameter of 0.15 µm used to form the coating material of example 1, α-FeOOH particles were used having a major axis diameter of 0.15 µm and 0.2 wt. % Al cladding.

Lower layer example 3

A lower layer was produced in the same way as in example 1 except that instead of the α-FeOOH particles having a major axis diameter of 0.15 µm used to form the coating material of example 1, α-FeOOH particles were used having a major axis diameter of 0.15 µm and 0.1 wt. % Al cladding.

Lower layer example 4

A lower layer was produced in the same way as in example 1 except that instead of the α-FeOOH particles having a major axis diameter of 0.15 µm used to form the coating material of example 1, α-FeOOH particles were used having a major axis diameter of 0.15 µm and 2.5 wt. % Al cladding.

Lower layer example 5

A lower layer was produced in the same way as in example 1 except that instead of the α-FeOOH particles having a major axis diameter of 0.15 µm used to form the coating material of example 1, α-FeOOH particles were used having a major axis diameter of 0.15 µm and 5.0 wt. % Al cladding.

Lower layer example 6

A lower layer was produced in the same way as in example 1 except that instead of the α-FeOOH particles having a major axis diameter of 0.15 µm used to form the coating material of example 1, α-FeOOH particles were used having a major axis diameter of 0.15 µm and 30.0 wt. % Al cladding.

Lower layer example 7

A lower layer was produced in the same way as in example 1 except that instead of the α-FeOOH particles having a major axis diameter of 0.15 µm used to form the coating material of example 1, α-FeOOH particles were used having a major axis diameter of 0.15 µm and 1.0 wt. % occluded Al.

Lower layer example 8

A lower layer was produced in the same way as in example 1 except that instead of the α-FeOOH particles having a major axis diameter of 0.15 µm used to form the coating material of example 1, α-FeOOH particles were used having a major axis diameter of 0.15 µm and 2.5 wt. % occluded Al.

Lower layer example 9

A lower layer was produced in the same way as in example 1 except that instead of the α-FeOOH particles having a major axis diameter of 0.15 µm used to form the coating material of example 1, α-FeOOH particles were used having a major axis diameter of 0.15 µm and 5.0 wt. % occluded Al.

Lower layer example 10

A lower layer was produced in the same way as in example 1 except that instead of the α-FeOOH particles having a major axis diameter of 0.15 µm used to form the coating material of example 1, α-FeOOH particles were used having a major axis diameter of 0.15 µm and 10.0 wt. % occluded Al.

Lower layer example 11

A lower layer was produced in the same way as in example 1 except that instead of the α-FeOOH particles having a major axis diameter of 0.15 µm used to form the coating material of example 1, α-FeOOH particles were used having a major axis diameter of 0.15 µm and 20.0 wt. % occluded Al.

Lower layer example 12

A lower layer was produced in the same way as in example 1 except that instead of the α-FeOOH particles having a major axis diameter of 0.15 µm used to form the coating material of example 1, α-FeOOH particles were used having a major axis diameter of 0.10 µm.

Lower layer example 13

A lower layer was produced in the same way as in example 1 except that instead of the α-FeOOH particles having a major axis diameter of 0.15 μm used to form the coating material of example 1, α-FeOOH particles were used having a major axis diameter of 0.30 μm.

Lower layer example 14

A lower layer was produced in the same way as in example 1 except that instead of the α-FeOOH particles having a major axis diameter of 0.15 μm used to form the coating material of example 1, α-FeOOH particles were used having a major axis diameter of 0.05 μm and 5.0 wt. % Al cladding.

Lower layer example 15

A lower layer was produced in the same way as in example 1 except that instead of the α-FeOOH particles having a major axis diameter of 0.15 μm used to form the coating material of example 1, α-FeOOH particles were used having a major axis diameter of 0.10 μm and 5.0 wt. % Al cladding.

Lower layer example 16

A lower layer was produced in the same way as in example 1 except that instead of the α-FeOOH particles having a major axis diameter of 0.15 μm used to form the coating material of example 1, α-FeOOH particles were used having a major axis diameter of 0.30 μm and 5.0 wt. % Al cladding.

Lower layer example 17

A lower layer was produced in the same way as in example 1 except that instead of the α-FeOOH particles having a major axis diameter of 0.15 μm used to form the coating material of example 1, α-FeOOH particles were used having a major axis diameter of 0.05 μm and 5.0 wt. % occluded Al.

Lower layer example 18

A lower layer was produced in the same way as in example 1 except that instead of the α-FeOOH particles having a major axis diameter of 0.15 μm used to form the coating material of example 1, α-FeOOH particles were used having a major axis diameter of 0.10 μm and 5.0 wt. % occluded Al.

Lower layer example 19

Lower layers were produced in which instead of the α-FeOOH particles having a major axis diameter of 0.15 μm used to form the coating material of example 1, α-FeOOH particles were used having a major axis diameter of 0.30 μm, 5.0 wt. % occluded Al, and a moisture amount of (A) 0.5 wt. %, (B) 1.0 wt. %, and (C) 2.0 wt. %.

Lower layer example 20

A lower layer was produced in the same way as in example 1 except that instead of the α-FeOOH particles having a major axis diameter of 0.15 μm used to form the coating material of example 1, α-FeOOH particles were used having a major axis diameter of 0.50 μm and 5.0 wt. % occluded Al.

Lower layer comparative example 1

A lower layer was produced in substantially the same way as in example 1 except that instead of the α-FeOOH particles having a major axis diameter of 0.15 μm used to form the coating material of example 1, α-$Fe_2O_3$ particles were used having a major axis diameter of 0.15 μm.

Lower layer comparative example 2

A lower layer was produced in substantially the same way as in example 1 except that instead of the α-FeOOH particles having a major axis diameter of 0.15 μm used to form the coating material of example 1, titanium oxide particles were used having an average diameter of 0.035 μm.

Lower layer comparative example 3

A lower layer was produced in the same way as in example 1 except that instead of the α-FeOOH particles having a major axis diameter of 0.15 μm used to form the coating material of example 1, α-FeOOH particles were used having a major axis diameter of 0.15 μm and 35.0 wt. % Al cladding.

Lower layer comparative example 4

A lower layer was produced in the same way as in example 1 except that instead of the α-FeOOH particles having a major axis diameter of 0.15 μm used to form the coating material of example 1, α-FeOOH particles were used having a major axis diameter of 0.15 μm and 35.0 wt. % occluded Al.

Lower layer comparative example 5

A lower layer was produced in the same way as in example 1 except that instead of the α-FeOOH particles having a major axis diameter of 0.15 μm used to form the coating material of example 1, α-FeOOH particles were used having a major axis diameter of 0.005 μm.

Lower layer comparative example 6

A lower layer was produced in the same way as in example 1 except that instead of the α-FeOOH particles having a major axis diameter of 0.15 μm used to form the coating material of example 1, α-FeOOH particles were used having a major axis diameter of 0.60 μm.

Lower layer comparative example 7

A lower layer was produced in the same way as in example 1 except that instead of the α-FeOOH particles having a major axis diameter of 0.15 μm used to form the coating material of example 1, α-FeOOH particles were used having a major axis diameter of 0.60 μm and 5.0 wt. % Al cladding.

Lower layer comparative example 8

A lower layer was produced in the same way as in example 1 except that instead of the α-FeOOH particles having a major axis diameter of 0.15 μm used to form the coating material of example 1, α-FeOOH particles were used having a major axis diameter of 0.60 μm and 5.0 wt. % occluded Al.

TABLE 1(A)

| Lower layer Example No. | Particle material | Al content wt % | Form of Al content | Moisture content wt % | Decomposition starting temperature °C. | Decomposition ending temperature °C. | Major axis diameter I μm | Minor axis diameter d μm |
|---|---|---|---|---|---|---|---|---|
| Lower layer Ex. 1 | FeOOH | 0 | | 1 | 190 | 250 | 0.15 | 0.022 |
| Comparative Ex. | | | | | | | | |
| 1 | Fe₂O₃ | | | 1 | | | 0.15 | 0.025 |
| 2 | TiO₂ | | | | | | 0.035 | |
| Lower layer Example | | | | | | | | |
| 2 | FeOOH | 0.2 | Cladding | 1 | | | 0.15 | 0.022 |
| 3 | FeOOH | 1 | | 1 | | | 0.15 | |
| 4 | FeOOH | 2.5 | | 1 | | | 0.15 | 0.022 |
| 5 | FeOOH | 5 | | 1 | | | 0.15 | 0.022 |
| 6 | FeOOH | 30 | | 1 | | | 0.15 | 0.022 |
| Comparative Example 3 | FeOOH | 35 | | 1 | | | 0.15 | 0.022 |
| Lower layer Example | | | | | | | | |
| 7 | FeOOH | 1 | Occluded | 1 | 220 | 290 | 0.15 | 0.023 |
| 8 | FeOOH | 2.5 | | 1 | | | 0.15 | 0.024 |
| 9 | FeOOH | 5 | | 1 | 250 | 330 | 0.15 | 0.025 |
| 10 | FeOOH | 10 | | 1 | 270 | 350 | 0.15 | 0.027 |
| 11 | FeOOH | 20 | | 1 | | | 0.15 | 0.030 |
| Comparative Example 4 | FeOOH | 35 | | 1 | | | 0.15 | 0.032 |

| Lower layer Example No. | I/d | BET m²/g | Dx Å | STA mg/m² | Resin mg/m² | pH | True specific gravity g/cm² | CD g/cm² | TAP g/cm² | Viscosity (ρ) | Roughness Å | Strength mg |
|---|---|---|---|---|---|---|---|---|---|---|---|---|
| Lower layer Ex. 1 | 6.8 | 101 | 80 | 1.18 | 1.08 | 9 | 4.08 | 1.23 | 0.52 | | 135 | 95 |
| Comparative Ex. | | | | | | | | | | | | |
| 1 | 6.0 | 55 | 170 | 1.61 | 1.61 | 9 | 5.07 | 1.85 | 0.65 | | 154 | 90 |
| 2 | | 40 | | | | 7 | 4.10 | | | | 145 | 80 |
| Lower layer Example | | | | | | | | | | | | |
| 2 | 6.8 | 100 | 80 | 1.15 | 1.05 | 9 | 4.08 | 1.23 | 0.52 | | 135 | 95 |
| 3 | 6.8 | 96 | 80 | 1.18 | 1.08 | 9 | 4.08 | 1.24 | 0.5 | | 125 | 98 |
| 4 | 6.8 | 90 | 80 | 1.20 | 1.09 | 9 | 4.08 | 1.25 | 0.49 | | 120 | 100 |
| 5 | 6.8 | 84 | 80 | 1.22 | 1.12 | 9 | 4.08 | 1.26 | 0.48 | | 115 | 105 |
| 6 | 6.8 | 100 | 80 | 1.25 | 1.15 | 9 | 4.08 | 1.26 | 0.47 | | 125 | 100 |
| Comparative Example 3 | 6.8 | 310 | 80 | 0.32 | 0.35 | 9 | 4.08 | 1.24 | 0.46 | | 180 | 80 |
| Lower layer Example | | | | | | | | | | | | |
| 7 | 6.5 | 100 | 81 | 1.15 | 1.05 | 9 | 4.05 | 1.25 | 0.48 | | 108 | 100 |
| 8 | 6.3 | 108 | 82 | 1.10 | 1.01 | 9 | 4.02 | 1.26 | 0.47 | | 105 | 102 |
| 9 | 6.0 | 118 | 83 | 1.04 | 0.94 | 9 | 4.00 | 1.27 | 0.46 | | 100 | 107 |
| 10 | 5.6 | 135 | 84 | 1.00 | 0.9 | 9 | 3.95 | 1.28 | 0.45 | | 110 | 105 |
| 11 | 5.0 | 147 | 85 | 0.99 | 0.89 | 9 | 3.90 | 1.29 | 0.44 | | 120 | 104 |
| Comparative Example 4 | 4.7 | 350 | 87 | 0.51 | 0.41 | 9 | 3.85 | 1.27 | 0.45 | | 155 | 82 |

TABLE 1(B)

| Lower layer Example No. | Particle material | Al content wt % | Form of Al content | Moisture content wt % | Decomposition starting temperature °C. | Decomposition ending temperature °C. | Major axis diameter I μm | Minor axis diameter d μm |
|---|---|---|---|---|---|---|---|---|
| Lower layer Example | | | | | | | | |
| 12 | FeOOH | 0 | | 1 | | | 0.10 | 0.019 |
| 13 | FeOOH | 0 | | 1 | | | 0.30 | 0.040 |

TABLE 1(B)-continued

| Comparative Example | | | | | | | |
|---|---|---|---|---|---|---|---|
| 5 | FeOOH | 0 | | 1 | | 0.005 | 0.003 |
| 6 | FeOOH | 0 | | 1 | | 0.60 | 0.070 |
| Lower layer Example | | | | | | | |
| 14 | FeOOH | 5 | Cladding | 1 | | 0.05 | 0.011 |
| 15 | FeOOH | 5 | | 1 | | 0.10 | 0.019 |
| 16 | FeOOH | 5 | | 1 | | 0.30 | 0.040 |
| Comparative Example 7 | FeOOH | 5 | | 1 | | 0.60 | 0.070 |
| Lower layer Example | | | | | | | |
| 17 | FeOOH | 5 | Occluded | 1 | | 0.05 | 0.013 |
| 18 | FeOOH | 5 | | 1 | | 0.10 | 0.023 |
| 19-A | FeOOH | 5 | | 0.5 | | 0.30 | 0.048 |
| 19-B | FeOOH | 5 | | 1.0 | | 0.30 | 0.048 |
| 19-C | FeOOH | 5 | | 2.0 | | 0.30 | 0.048 |
| 20 | FeOOH | 5 | | 1 | | 0.50 | 0.050 |
| Comparative Example 8 | FeOOH | 5 | | 1 | | 0.60 | 0.080 |

| Lower layer Example No. | I/d | BET m²/g | Dx Å | STA mg/m² | Resin mg/m² | pH | True specific gravity g/cm³ | CD g/cm³ | TAP g/cm³ | Viscosity (ρ) | Roughness Å | Strength mg |
|---|---|---|---|---|---|---|---|---|---|---|---|---|
| Lower layer Example | | | | | | | | | | | | |
| 12 | 5.3 | 120 | 75 | 1.15 | 1.05 | 9 | 4.20 | 1.20 | 0.54 | | 130 | 98 |
| 13 | 7.5 | 55 | 100 | 1.46 | 1.36 | 9 | 3.60 | 1.40 | 0.46 | | 140 | 98 |
| Comparative Example | | | | | | | | | | | | |
| 5 | 1.7 | 320 | 50 | 0.66 | 0.30 | 9 | 4.26 | 1.00 | 0.66 | | 180 | 75 |
| 6 | 8.6 | 30 | 110 | 1.60 | 1.80 | 9 | 3.52 | 1.60 | 0.38 | | 230 | 70 |
| Lower layer Example | | | | | | | | | | | | |
| 14 | 4.5 | 190 | 68 | 0.80 | 0.70 | 9 | 4.25 | 1.10 | 0.54 | | 110 | 105 |
| 15 | 5.3 | 110 | 75 | 1.08 | 0.98 | 9 | 4.20 | 1.16 | 0.52 | | 110 | 107 |
| 16 | 7.5 | 50 | 100 | 1.83 | 1.73 | 9 | 3.60 | 1.43 | 0.42 | | 120 | 106 |
| Comparative Example 7 | 8.6 | 25 | 110 | 2.29 | 2.19 | 9 | 3.52 | 1.60 | 0.36 | | 200 | 95 |
| Lower layer Example | | | | | | | | | | | | |
| 17 | 3.8 | 220 | 70 | 0.74 | 0.64 | 9 | 4.23 | 1.18 | 0.55 | | 100 | 107 |
| 18 | 4.3 | 120 | 81 | 1.01 | 0.91 | 9 | 4.05 | 1.25 | 0.5 | | 100 | 109 |
| 19-A | 6.3 | 53 | | 1.79 | 1.78 | 8 | | | | 80 | 125 | |
| 19-B | 6.3 | 53 | 103 | 1.75 | 1.65 | 9 | 3.58 | 1.45 | 0.45 | 30 | 110 | 108 |
| 19-C | 6.3 | 53 | | 1.71 | 1.48 | 9.5 | | | | 10 | 110 | |
| 20 | 10.0 | 40 | 110 | 1.85 | 1.75 | 9 | 3.55 | 1.50 | 0.40 | | 120 | 100 |
| Comparative Example 8 | 7.5 | 31 | 112 | 1.98 | 1.88 | 9 | 3.5 | 1.6 | 0.35 | | 180 | 97 |

The results arranged in Table 1-A and 1-B show that compared to the comparative examples, the lower base layer formed using α-FeOOH according to the present invention has low surface roughness, giving it excellent surface smoothness adequate strength. Thus, as described in the foregoing, when the non-magnetic lower layer is formed with α-FeOOH particles according to this invention, using acicular metal particles having the component composition and properties listed below to constitute the upper layer enables a magnetic recording medium having a multilayer structure to be obtained that exhibits excellent magnetic properties, surface qualities, strength and weather resistance.

Next, the magnetic particles used for the upper layer are acicular ferromagnetic metal particles of Fe containing from more than 5 to 50 at. % Co, 0.1 to 30 at. % Al, 0.1 to 10 at. % rare earth elements (including Y), up to 0.05 wt. % periodic table group 1a elements and up to 0.1 wt. % (including 0 wt. %) periodic table group 2a elements. It is preferable that these acicular ferromagnetic metal particles have an average major axis diameter of 0.01 to 0.4 μm, a BET specific surface area of 30 to 70 m²/g, a crystalline diameter of 50 to 250 angstrom, a coercive force Hc of 1200 to 3000 (Oe) and a saturation magnetic flux density σs of 100 to 200 (emu/g). It is also preferable that the acicular ferromagnetic metal particles used do not release more than 2 wt. % $H_2O$ at 100° C. and not more than 4.0 wt. % $H_2O$ at 300° C.

To briefly outline the reasons for the stated limits on the content ranges of the constituent components of the metal particles, Co improves the coercive force Hc and saturation magnetic flux density σs, helps to reduce crystalline diameter, and is also effective for avoiding a lowering of Δσs shown below in the Examples. However, with a Co content of 5 at. % or less, these effects are not sufficiently realized. On the other hand, the coercive force Hc is decreased if the Co content is more than 50 at. %, so the content range is defined as from more than 5 at. % to not more than 50 at. %. Preferably the Co content is from over 4 to 40 at. %, more preferably 10 to 35 at. %.

Al improves the dispersibility (sintering prevention) of the fine acicular particles, and during reduction of the particles has a pronounced shape-maintaining effect. This effect is not realized with less than 0.1 at. % Al, while more than 30 at. % reduces the saturation magnetization, degrading the magnetic properties. Therefore the Al content range is set at 0.1 to 30 at. %, preferably 1 to 20 at. %, more preferably 5 to 15 at. %. With respect to when the Al is contained as a compound (oxide), the Al content specified refers not to the amount of the compound but to the content of just the element Al.

Like Al, rare earth elements (including Y) prevent sintering of the metal particles, improving dispersibility. With a content of less than 0.1 at. %, the effect is so small that sintering occurs readily, while exceeding 10 at. % increases the amount of oxides of the various elements, reducing the saturation magnetization, which is unsuitable for the magnetic metal particles for the upper layer. Rare earth elements that are usable include Y, La, Ce, Pr, Nd, Sm, Tb, Dy, and Gd. When used in combination the total amount is set at 0.1 to 10 at. %. With respect to when these elements are contained as a compound, the content specified herein refers not to the amount of the compound but to the content amount in the compound of the element concerned.

Periodic table group 1a elements that are usable include Li, Na, and K. If a soluble salt of such elements adheres to the surface of the particles, the dispersibility of the particles in the resinous binder deteriorates and the storage-stability and weather resistance of the product medium are degraded. Thus the content amount of these elements is set at not more than 0.05 wt. %. Even if these elements are used in combination, the total amount is still limited to not more than 0.05 wt. %. These group 1a elements promote sintering during the reduction step of the process used to manufacture the acicular ferromagnetic particles, so prior to the reduction step it is desirable to exclude them as much as possible.

Periodic table group 2a elements that are usable include Mg, Ca, Sr, and Ba. If a soluble salt of such elements adheres to the surface of the particles, the dispersibility of the particles in the resinous binder deteriorates and the storage-stability and weather resistance of the product medium are degraded. The content amount of these elements therefore is set at not more than 0.1 wt. %, including when used in combination.

With respect to moisture held by the metal particles, the amount detected (released) at 100° C. should be not more than 2.0 wt. %, preferably not more than 1.5 wt. %, and the amount detected (released) at 300° C. should be not more than 4.0 wt. %, preferably not more than 3.0 wt. %. The viscosity of the coating material and the binder adsorption amount both depend on the moisture amount held by the metal particles. If the amount of $H_2O$ detected at 100° C. is more than 2.0 wt. %, or if the amount detected at 300° C. is more than 4.0 wt. %, dispersal of the coating on the lower layer will be insufficient, making it difficult to form tape.

A suitable size for the acicular metal particles is an average major axis diameter of 0.01 to 0.4 $\mu$m, preferably 0.04 to 0.2 $\mu$m. Particles with an average major axis diameter that is less than 0.01 $\mu$m become superparamagnetic, which sharply reduces the electromagnetic conversion characteristics, while exceeding 0.4 $\mu$m results in metal particles having multiple magnetic domains, which reduces the electromagnetic conversion characteristics. Therefore, to ensure the magnetic recording medium having a multilayer structure has the intended magnetic properties, the acicular particles used should have an average major axis diameter of 0.01 to 0.4 $\mu$m.

A suitable BET specific surface area for the metal particles is 30 to 70 $m^2/g$, preferably 40 to 60 $m^2/g$. A specific surface area that is less than 30 $m^2/g$ result in deterioration of the compatibility with the resin during tape formation, degrading the electromagnetic conversion characteristics, while exceeding 70 $m^2/g$ results in poor dispersion during tape formation, which also degrades the electromagnetic conversion characteristics.

A suitable size for the crystals of the magnetic metal particles is 50 to 250 angstrom, preferably 100 to 200 angstrom. If the crystals are smaller than 50 angstrom the magnetic particles will become superparamagnetic, sharply reducing the electromagnetic conversion characteristics, while crystals that are larger than 250 angstrom result in higher noise, which also reduces electromagnetic conversion characteristics.

The higher the coercive force Hc of the magnetic metal particles is, the more suitable it is for high-density recording. However, taken together with the performance of the magnetic head, the coercive force is controlled to 1200 to 3000 (Oe), preferably 1600 to 2600 (Oe). The higher the saturation magnetic flux density σs is, the higher the output becomes, but to achieve a balance with oxidation resistance, noise and the like, 120 to 180 emu/g is preferable.

Metal particles having the described composition and properties can be produced by adding a prescribed amount of Al to Co-containing α-FeOOH or iron oxide and reducing the result at an elevated temperature. As the particle compound containing α-FeOOH or iron oxide as the main component that is thus subjected to heat-reduction, there can be used α-FeOOH, γ-FeOOH, α-$Fe_2O_3$, γ-$Fe_2O_3$, $Fe_3O_4$, and compounds corresponding to intermediates thereof, and a metal component added thereto such as Ni, Cr, Mn, Zn and the like, with substances having good acicular properties being preferred.

Water-soluble salts such as $Al_2(SO_4)_3$, $Al(NO_3)_3$, $AlCl_3$, and water-soluble aluminates such as $NaAlO_2$ are usable as the Al compound used to add the Al. These Al compounds may be coated on the surface of the particles by dissolving the Al compound in an alkaline solution, dispersing the particles in the solution and neutralizing the solution by blowing carbonic gas into the solution or by adding an acid, thereby cladding the surface of the particles with Al in the form of crystalline or amorphous $Al_2O_3 \cdot nH_2O$ (aluminum hydroxide). The Al can also be occluded within the particles.

The Al can be occluded in Co-containing α-FeOOH or γ-FeOOH by adding a water-soluble Al salt or aluminate to the reaction system used to produce the α-FeOOH or γ-FeOOH by using a neutralizer such as NaOH, $Na_2CO_3$, or $NH_4OH$ to neutralize a solution in which the main component is a ferrous salt such as $FeSO_4$ or $FeCl_2$, and then oxidizing the solution in air. The Al may also be occluded in Co-containing α-$Fe_2O_3$ by using a solution of a ferric salt such as $Fe_2(SO4)_3$ or $FeCl_3$, for example, and a neutralizer such as NaOH or KOH and adding the above water-soluble Al salt or aluminate to the reaction system used to synthesize $Fe_2O3$ by hydrothermal synthesis.

The Co-containing α-FeOOH or iron oxide with added Al can then be heated to fix the Al as $Al_2O_3$ to form the material used in the step in which Y (including rare earth elements) is added. At this point, the α-FeOOH is transformed to iron oxide by dehydration. Methods that can be used include dispersing the source particles in a solution containing Y and adding an alkali to effect precipitation in the form of a hydroxide, or dispersing the source particles in a Y compound solution and evaporating the water. Iron oxide particles to which a prescribed amount of Co, Al and Y (including rare earth elements) has been added by the above methods are reduced by being heated in a reducing atmosphere to obtain magnetic metal particles which have reduced iron as the main component and contain Co, Al and Y (including rare earth elements).

In specifying a periodic table group 1a element content of not more than 0.05 wt. % and a periodic table group 2a element content of not more than 0.1 wt. % for the magnetic metal particles, in addition to using source materials that include no group 1a or 2a elements or as little as possible, it is also preferable to remove such elements by thoroughly washing the compounds at each of the FeOOH, iron oxide, and magnetic metal particle stage. Washing becomes increasingly effective, since with the progress from step to step, the above elements migrate to the surface of the particles. The removal effect is enhanced by using hot water or water to which acid has been added to reduce the pH. If the content of group 1a elements exceeds 0.05 wt. %, when it comes to forming the tape, compatibility with the resin deteriorates, preventing dispersion, and even if the magnetic coating material is formed, the coating film has low strength. Moreover, since these elements are soluble, if the tape is kept for a certain time, the elements precipitate on the tape surface, forming crystalline compounds that increase drop-outs and degrade the storage stability of the tape. If the content of group 2a elements exceeds 0.1 wt. %, compatibility with the resin and coating film strength are both reduced; if a very high content is used, as in the case of group 1a elements, the storage stability of the tape is degraded.

The substrate used to form the multilayer magnetic recording medium may be a known film of a polyester such as polyethylene terephthalate, polyethylene naphthalate, a polyolefin, cellulose triacetate, polycarbonate, polyamide, polyimide, polyamide-imide, polysulfone aramide, or aromatic polyamide.

Representative examples of the coating type magnetic recording medium having a multilayer structure (a tape) in accordance with this invention will now be described, together with comparative examples.

EXAMPLES

Example 1

A lower layer coating material having the following composition was prepared.

| | |
|---|---|
| α-FeOOH (In this example, the major axis diameter was 0.15 μm and moisture amount at 100° C. was 1 wt. %.) | 100 parts by weight |
| Polyurethane resin | 20 parts by weight |
| Methyl ethyl ketone | 165 parts by weight |
| Cyclohexanon | 65 parts by weight |
| Toluene | 165 parts by weight |
| Stearic acid | 1 part by weight |
| Acetyl acetone | 1 part by weight |

Coating material having the above composition obtained after dispersion for one hour using a centrifugal ball mill was applied with an applicator to a polyethylene terephthalate base film to form a lower layer. The properties of the α-FeOOH particles used and of the lower layer thus obtained are listed in Table 2-(2) which is continued from Table 2-(1). The measurement methods used were the same used with respect to the test examples of Table 1 (A,B).

An upper layer coating material having the following composition was prepared.

| | |
|---|---|
| Magnetic metal particles (In this example, Fe containing 30 at. % Co, 10 at. % Al, 4 at. % Y 0.002 wt. % Na, and 0.004 wt. % Ca) | 100 parts by weight |
| Polyurethane resin | 30 parts by weight |
| Methyl ethyl ketone | 190 parts by weight |
| Cyclohexanon | 80 parts by weight |
| Toluene | 110 parts by weight |
| Butyl stearate | 1 part by weight |
| Acetyl acetone | 1 part by weight |
| α-alumina | 3 parts by weight |
| Carbon black | 2 parts by weight |

Upper layer coating material having the above composition obtained after dispersion for one hour using a centrifugal ball mill was coated on the above lower layer with an applicator to form a sample sheet that was calendered and slit into 8-mm widths to form magnetic tape. The properties of the magnetic metal particles used and of the magnetic tape thus obtained are listed in Table 2-(1) which follows to Table 2-(2)

The following Examples are also listed in Table 2-(1) and Table 2-(2), and the following comparative examples are listed in Table 3-(1) and Table 3-(2)

Example 2

Magnetic tape was obtained in the same way as in Example 1 except that instead of the α-FeOOH particles having a major axis diameter of 0.15 μm used to form the lower layer in Example 1, α-FeOOH particles were used having a major axis diameter of 0.30 μm.

Example 3

Magnetic tape was obtained in the same way as in Example 1 except that instead of the Co content, Y content and major axis diameter of the magnetic metal particles used to form the upper layer in Example 1, magnetic metal particles having a Co content of 10 at. %, Y content of 2 at. % and a major axis diameter of 0.095 μm were used.

Example 4

Magnetic tape was obtained in the same way as in Example 1 except that instead of the α-FeOOH particles having a major axis diameter of 0.15 μm used to form the lower layer in Example 1, α-FeOOH particles were used having a major axis diameter of 0.30 μm and 5 wt. % Al cladding.

Example 5

Magnetic tape was obtained in the same way as in Example 1 except that instead of the α-FeOOH particles having a major axis diameter of 0.15 μm used to form the lower layer in Example 1, α-FeOOH particles were used having a major axis diameter of 0.30 μm and 5 wt. % occluded Al.

Example 6

Magnetic tape was obtained in the same way as in Example 5 except that instead of the Co content, Al content and Y content and major axis diameter of the magnetic metal particles used to form the upper layer in Example 5, magnetic metal particles having a Co content of 30 at. %, Al content of 8 at. %, Y content of 3 at. % and a major axis diameter of 0.08 μm were used.

Example 7

Magnetic tape was obtained in the same way as in Example 1 except that instead of the α-FeOOH particles having a major axis diameter of 0.15 μm used to form the lower layer in Example 1, α-FeOOH particles were used having a major axis diameter of 0.10 μm and 5 wt. % occluded Al.

Example 8

Magnetic tape was obtained in the same way as in Example 5 except that instead of the Y content of the magnetic metal particles used to form the upper layer in Example 5, magnetic metal particles having a La content of 4 at. % were used.

Example 9

Magnetic tape was obtained in the same way as in Example 5 except that instead of the Co content, Al content and Y content and major axis diameter of the magnetic metal particles used to form the upper layer in Example 5, magnetic metal particles having a Co content of 10 at. %, Al content of 10 at. %, Y content of 4 at. % and a major axis diameter of 0.08 μm were used.

Example 10

Magnetic tape was obtained in the same way as in Example 5 except that instead of the Co content, Al content and Y content and major axis diameter of the magnetic metal particles used to form the upper layer in Example 5, magnetic metal particles having a Co content of 20 at. %, Al content of 10 at. %, Y content of 4 at. % and a major axis diameter of 0.08 μm were used.

Example 11

Magnetic tape was obtained in the same way as in Example 5 except that instead of the Co content, Al content and Y content and major axis diameter of the magnetic metal particles used to form the upper layer in Example 5, magnetic metal particles having a Co content of 40 at. %, Al content of 10 at. %, Y content of 4 at. % and a major axis diameter of 0.08 μm were used.

Example 12

Magnetic tape was obtained in the same way as in Example 5 except that instead of the Co content, Al content and Y content and major axis diameter of the magnetic metal particles used to form the upper layer in Example 5, magnetic metal particles having a Co content of 50 at. %, Al content of 10 at. %, Y content of 4 at. % and a major axis diameter of 0.08 μm were used.

Example 13

Magnetic tape was obtained in the same way as in Example 5 except that instead of the Co content, Al content, Y content, Na content, Ca content and major axis diameter of the magnetic metal particles used to form the upper layer in Example 5, magnetic metal particles having a Co content of 30 at. %, Al content of 10 at. %, Y content of 4 at. %, Na content of 0.006 wt. %, Ca content of 0.12 wt. % and a major axis diameter of 0.08 μm were used.

Example 14

Magnetic tape was obtained in the same way as in Example 1 except that instead of the α-FeOOH particles used to form the lower layer in Example 1, α-FeOOH particles having a major axis diameter of 0.30 μm and a Si content of 2.5 wt. % were used.

Example 15

Magnetic tape was obtained in the same way as in Example 1 except that instead of the α-FeOOH particles used to form the lower layer in Example 1, α-FeOOH particles were used having a major axis diameter of 0.30 μm, 5 wt. % occluded Al and 2.5 wt. % Si.

Comparative example 1

Magnetic tape was obtained in substantially the same way as in Example 1 except that instead of the α-FeOOH particles used to form the lower layer in Example 1, α-$Fe_2O_3$ particles were used having a major axis diameter of 0.15 μm.

Comparative example 2

Magnetic tape was obtained in substantially the same way as in Example 1 except that instead of the α-FeOOH particles used to form the lower layer in Example 1, titanium oxide particles were used having an average diameter of 0.035 μm.

Comparative example 3

Magnetic tape was obtained in the same way as in Example 1 except that instead of the α-FeOOH particles used to form the lower layer in Example 1, α-FeOOH particles were used having a major axis diameter of 0.30 μm and 35 wt. % occluded Al.

Comparative example 4

Magnetic tape was obtained in the same way as in Example 5 except that instead of the Co content, Al content, Y content and major axis diameter of the magnetic metal particles used to form the upper layer in Example 5, magnetic metal particles having a Co content of 3 at. %, Al content of 10 at. %, Y content of 4 at. % and a major axis diameter of 0.08 μm were used.

Comparative example 5

Magnetic tape was obtained in the same way as in Example 5 except that instead of the Co content, Al content, Y content and major axis diameter of the magnetic metal particles used to form the upper layer in Example 5, magnetic metal particles having a Co content of 55 at. %, Al content of 10 at. %, Y content of 4 at. % and a major axis diameter of 0.08 μm were used.

Comparative example 6

Magnetic tape was obtained in the same way as in Example 5 except that instead of the Co content, Al content, Y content and major axis diameter of the magnetic metal particles used to form the upper layer in Example 5, magnetic metal particles having a Co content of 30 at. %, Al content of 0 at. %, Y content of 4 at. % and a major axis diameter of 0.08 μm were used.

Comparative example 7

Magnetic tape was obtained in the same way as in Example 5 except that instead of the Co content, Al content, Y content and major axis diameter of the magnetic metal particles used to form the upper layer in Example 5, magnetic metal particles having a Co content of 30 at. %, Al content of 35 at. %, Y content of 4 at. % and a major axis diameter of 0.08 μm were used.

Comparative example 8

Magnetic tape was obtained in the same way as in Example 5 except that instead of the Co content, Al content, Y content and major axis diameter of the magnetic metal particles used to form the upper layer in Example 5, magnetic metal particles having a Co content of 30 at. %, Al content of 10 at. %, Y content of 0 at. % and a major axis diameter of 0.08 μm were used.

Comparative example 9

Magnetic tape was obtained in the same way as in Example 5 except that instead of the Co content, Al content, Y content and major axis diameter of the magnetic metal particles used to form the upper layer in Example 5, magnetic metal particles having a Co content of 30 at. %, Al content of 10 at. %, Y content of 15 at. % and a major axis diameter of 0.08 μm were used.

Comparative example 10

Magnetic tape was obtained in the same way as in Example 5 except that instead of the Co content, Al content, Y content, Na content, Ca content and major axis diameter of the magnetic metal particles used to form the upper layer in Example 5, magnetic metal particles having a Co content of 30 at. %, Al content of 10 at. %, Y content of 4 at. %, Na content of 0.16 wt. %, Ca content of 0.12 wt. % and a major axis diameter of 0.08 μm were used.

Comparative example 11

Magnetic tape was obtained in the same way as in Example 1 except that instead of the α-FeOOH particles used to form the lower layer in Example 1, particles were used having a major axis diameter of 0.30 μm, 5 wt. % occluded Al and 35 wt. % Si.

Comparative example 12

Magnetic tape was obtained in the same way as in comparative example 11 except that instead of the moisture amount of the magnetic metal particles used to form the upper layer in comparative example 11, particles were used having 3.5 wt. % moisture at 100° C. and 5.5 wt. % moisture at 300° C.

Comparative example 13

Magnetic tape was obtained in the same way as in comparative example 11 except that instead of the moisture amount of the magnetic metal particles used to form the lower layer in comparative example 11, the magnetic metal particles were used having 3.5 wt. % moisture at 100° C.

TABLE 2(1)

| | Upper layer | | | | | | | |
|---|---|---|---|---|---|---|---|---|
| | Component Contents of Metal magnetic particles | | | | | | Moisture content | |
| Example No. | Co at % | Al at % | Y at % | La at % | Na wt % | Soluble Ca wt % | Moisture content at 100° C. wt % | Moisture content at 300° C. wt % |
| Example | | | | | | | | |
| 1 | 30 | 10 | 4 | 0 | 0.002 | 0.004 | 1.0 | 1.7 |
| 2 | 30 | 10 | 4 | 0 | 0.002 | 0.004 | 1.0 | 1.7 |
| 3 | 10 | 10 | 2 | 0 | 0.002 | 0.004 | 1.0 | 1.7 |
| 4 | 30 | 10 | 4 | 0 | 0.002 | 0.004 | 1.0 | 1.7 |
| 5 | 30 | 10 | 4 | 0 | 0.002 | 0.004 | 1.0 | 1.7 |
| 6 | 30 | 8 | 3 | 0 | 0.002 | 0.004 | 1.0 | 1.7 |
| 7 | 30 | 10 | 4 | 0 | 0.002 | 0.004 | 1.0 | 1.7 |
| 8 | 30 | 10 | 0 | 4 | 0.002 | 0.004 | 1.0 | 1.7 |
| 9 | 10 | 10 | 4 | 0 | 0.002 | 0.004 | 1.0 | 1.7 |
| 10 | 20 | 10 | 4 | 0 | 0.002 | 0.004 | 1.0 | 1.7 |
| 11 | 40 | 10 | 4 | 0 | 0.002 | 0.004 | 1.0 | 1.7 |
| 12 | 50 | 10 | 4 | 0 | 0.002 | 0.004 | 1.0 | 1.7 |
| 13 | 30 | 10 | 4 | 0 | 0.002 | 0.12 | 1.0 | 1.7 |
| 14 | 30 | 10 | 4 | 0 | 0.002 | 0.004 | 1.0 | 1.7 |
| 15 | 30 | 10 | 4 | 0 | 0.002 | 0.004 | 1.0 | 1.7 |

| | Upper layer | | | | | | | | |
|---|---|---|---|---|---|---|---|---|---|
| | Particle properties | | | | | Magnetic properties | | | |
| Example No. | Major axis diameter μm | Aspect ratio | BET m²/g | Crystal size Å | Particle pH | St. adsorption mg/m² | Hc Oe | σs emu/g | σr/σs | Δσs % |
| Example | | | | | | | | | | |
| 1 | 0.08 | 5 | 49 | 170 | 9.4 | 101 | 2340 | 146 | 0.52 | 9.2 |
| 2 | 0.08 | 5 | 49 | 170 | 9.4 | 101 | 2340 | 146 | 0.52 | 9.2 |

TABLE 2(1)-continued

| | | | | | | | | | | |
|---|---|---|---|---|---|---|---|---|---|---|
| 3 | 0.095 | 5 | 57 | 175 | 9.5 | 115 | 1820 | 130 | 0.51 | 9.8 |
| 4 | 0.08 | 5 | 49 | 170 | 9.4 | 101 | 2340 | 146 | 0.52 | 9.2 |
| 5 | 0.08 | 5 | 49 | 170 | 9.4 | 101 | 2340 | 146 | 0.52 | 9.2 |
| 6 | 0.08 | 5 | 48 | 160 | 9.4 | 98 | 2300 | 147 | 0.52 | 10.2 |
| 7 | 0.08 | 5 | 49 | 170 | 9.4 | 101 | 2340 | 146 | 0.52 | 9.2 |
| 8 | 0.08 | 5 | 49 | 170 | 9.3 | 101 | 2335 | 146 | 0.52 | 9.3 |
| 9 | 0.08 | 5 | 53 | 185 | 9.4 | 111 | 2040 | 131 | 0.51 | 11.2 |
| 10 | 0.08 | 5 | 51 | 175 | 9.4 | 106 | 2315 | 140 | 0.52 | 9.3 |
| 11 | 0.08 | 5 | 48 | 173 | 9.4 | 96 | 2120 | 155 | 0.51 | 9.2 |
| 12 | 0.08 | 4 | 47 | 175 | 9.4 | 93 | 2000 | 153 | 0.49 | 9.2 |
| 13 | 0.08 | 5 | 50 | 170 | 10.3 | 109 | 2346 | 145 | 0.51 | 9.5 |
| 14 | 0.08 | 5 | 49 | 170 | 9.4 | 101 | 2340 | 146 | 0.52 | 9.2 |
| 15 | 0.08 | 5 | 49 | 170 | 9.4 | 101 | 2340 | 146 | 0.52 | 9.2 |

TABLE 2(2)

| | Lower layer | | | | | | | | | | | | |
|---|---|---|---|---|---|---|---|---|---|---|---|---|---|
| | Component | | | | | Particle properties | | | | | | | |
| Example No. | Particle material | Al wt % | Form of Al content | Si wt % | Moisture content at 100° C. wt % | Major axis diameter μm | Minor axis diameter μm | Aspect ratio | BET m²/g | Crystal size Å | Particle pH | TAP g/cm² | True specific gravity g/cm² | CD g/cm² |
| Example | | | | | | | | | | | | | | |
| 1 | FeOOH | 0 | | 0 | 1.0 | 0.15 | 0.022 | 6.8 | 101 | 80 | 9 | 0.52 | 4.08 | 1.23 |
| 2 | FeOOH | 0 | | 0 | 1.0 | 0.3 | 0.04 | 7.5 | 55 | 100 | 9 | 0.46 | 3.6 | 1.4 |
| 3 | FeOOH | 5 | | 0 | 1.0 | 0.15 | 0.022 | 6.8 | 101 | 80 | 9 | 0.52 | 4.08 | 1.23 |
| 4 | FeOOH | 5 | Cladding | 0 | 1.0 | 0.3 | 0.04 | 7.5 | 50 | 100 | 9 | 0.42 | 3.6 | 1.43 |
| 5 | FeOOH | 5 | Occluded | 0 | 1.0 | 0.3 | 0.048 | 6.3 | 53 | 103 | 9 | 0.45 | 3.58 | 1.45 |
| 6 | FeOOH | 5 | | 0 | 1.0 | 0.3 | 0.048 | 6.3 | 53 | 103 | 9 | 0.45 | 3.58 | 1.45 |
| 7 | FeOOH | 5 | | 0 | 1.0 | 0.3 0.023 | | 4.3 | 120 | 81 | 9 | 0.50 | 4.05 | 1.25 |
| 8 | FeOOH | 5 | | 0 | 1.0 | 0.3 | 0.048 | 6.3 | 53 | 103 | 9 | 0.45 | 3.58 | 1.45 |
| 9 | FeOOH | 5 | | 0 | 1.0 | 0.3 | 0.048 | 6.3 | 120 | 103 | 9 | 0.45 | 3.58 | 1.42 |
| 10 | FeOOH | 5 | | 0 | 1.0 | 0.3 | 0.048 | 6.3 | 53 | 103 | 9 | 0.45 | 3.58 | 1.45 |
| 11 | FeOOH | 5 | | 0 | 1.0 | 0.3 | 0.048 | 6.3 | 53 | 103 | 9 | 0.45 | 3.58 | 1.45 |
| 12 | FeOOH | 5 | | 0 | 1.0 | 0.3 | 0.048 | 6.3 | 53 | 103 | 9 | 0.45 | 3.58 | 1.45 |
| 13 | FeOOH | 5 | | 0 | 1.0 | 0.3 | 0.048 | 6.3 | 53 | 103 | 9 | 0.45 | 3.58 | 1.45 |
| 14 | FeOOH | 0 | | 2.5 | 1.0 | 0.3 | 0.048 | 6.3 | 61 | 100 | 9 | 0.42 | 3.63 | 1.44 |
| 15 | FeOOH | 5 | Occuluded | 2.5 | 1.0 | 0.3 | 0.048 | 6.3 | 58 | 103 | 9 | 0.43 | 3.58 | 1.47 |

| | Tape properties | | | | | | | |
|---|---|---|---|---|---|---|---|---|
| Example No. | Roughness Å | Strength mg | Hc Oe | Bm G | Br/Bm | Δ Bm % | Output dB | C/N dB | Precipitation after weather test |
| Example | | | | | | | | | |
| 1 | 133 | 95 | 2350 | 4100 | 0.84 | 3.2 | +5.2 | +5.4 | No |
| 2 | 100 | 106 | 2360 | 4120 | 0.84 | 3 | +5.1 | +5.4 | No |
| 3 | 130 | 95 | 1870 | 3200 | 0.85 | 3.7 | +3.2 | +3.4 | No |
| 4 | 100 | 106 | 2380 | 4140 | 0.84 | 3 | +5.4 | +5.5 | No |
| 5 | 98 | 108 | 2390 | 4150 | 0.84 | 2.8 | +5.7 | +5.9 | No |
| 6 | 99 | 108 | 2380 | 4170 | 0.84 | 2.8 | +5.6 | +5.8 | No |
| 7 | 99 | 109 | 2390 | 4170 | 0.84 | 2.8 | +5.6 | +6.8 | No |
| 8 | 100 | 107 | 2385 | 4150 | 0.84 | 2.9 | +5.6 | +5.8 | No |
| 9 | 103 | 103 | 2130 | 3800 | 0.85 | 3.8 | +4.3 | +4 | No |
| 10 | 99 | 107 | 2365 | 4090 | 0.85 | 3.1 | 5.2 | +5.4 | No |
| 11 | 99 | 107 | 2200 | 4350 | 0.83 | 3.9 | +4.7 | +4.9 | No |
| 12 | 102 | 104 | 2050 | 4300 | 0.82 | 3.9 | +3.6 | +3.5 | No |
| 13 | 111 | 95 | 2380 | 3900 | 0.83 | 3.2 | +5.3 | +5.4 | No |
| 14 | 94 | 120 | 2370 | 4140 | 0.84 | 3 | +4.2 | +4.3 | No |
| 15 | 94 | 109 | 2395 | 4160 | 0.84 | 2.8 | +5.9 | +6.0 | No |

TABLE 3(1)

| | Upper layer | | | | | | | |
|---|---|---|---|---|---|---|---|---|
| | Component Contents of | | | | | | Moisture content | |
| | Metal magnetic particles | | | | | | Moisture | Moisture |
| Example No. | Co at % | Al at % | Y at % | La at % | Na wt % | Soluble Ca wt % | content at 100° C. wt % | content at 300° C. wt % |
| Comparative Example | | | | | | | | |
| 1 | 30 | 10 | 4 | 0 | 0.002 | 0.004 | 1.0 | 1.7 |
| 2 | 30 | 10 | 4 | 0 | 0.002 | 0.004 | 1.0 | 1.7 |
| 3 | 30 | 10 | 4 | 0 | 0.002 | 0.004 | 1.0 | 1.7 |
| 4 | 3 | 10 | 4 | 0 | 0.002 | 0.004 | 1.0 | 1.7 |
| 5 | 55 | 10 | 4 | 0 | 0.002 | 0.004 | 1.0 | 1.7 |
| 6 | 30 | 0 | 4 | 0 | 0.002 | 0.004 | 1.0 | 1.7 |
| 7 | 30 | 35 | 4 | 0 | 0.002 | 0.004 | 1.0 | 1.7 |
| 8 | 30 | 10 | 0 | 0 | 0.002 | 0.004 | 1.0 | 1.7 |
| 9 | 30 | 10 | 15 | 0 | 0.002 | 0.004 | 1.0 | 1.7 |
| 10 | 30 | 10 | 4 | 0 | 0.16 | 0.12 | 1.0 | 1.7 |
| 11 | 30 | 10 | 4 | 0 | 0.002 | 0.004 | 1.0 | 1.7 |
| 12 | 30 | 10 | 4 | 0 | 0.002 | 0.004 | 3.5 | 5.5 |
| 13 | 30 | 10 | 4 | 0 | 0.002 | 0.004 | 1.0 | 1.7 |

| | Upper layer | | | | | | | | |
|---|---|---|---|---|---|---|---|---|---|
| | Particle properties | | | | | Magnetic properties | | | |
| Example No. | Major axis diameter μm | Aspect ratio | BET m²/g | Crystal size Å | Particle pH | St. adsorption mg/m² | Hc Oe | σs emu/g | σr/σs | Δσs % |
| Comparative Example | | | | | | | | | | |
| 1 | 0.08 | 5 | 49 | 170 | 9.4 | 101 | 2340 | 146 | 0.52 | 9.2 |
| 2 | 0.08 | 5 | 49 | 170 | 9.4 | 101 | 2340 | 146 | 0.52 | 9.2 |
| 3 | 0.08 | 5 | 49 | 170 | 9.4 | 101 | 2340 | 146 | 0.52 | 9.2 |
| 4 | 0.08 | 6 | 53 | 200 | 9.4 | 103 | 1960 | 121 | 0.49 | 14.2 |
| 5 | 0.08 | 4 | 46 | 177 | 9.4 | 91 | 1700 | 150 | 0.47 | 9.2 |
| 6 | 0.08 | 5 | 49 | 180 | 9.4 | 107 | 1650 | 151 | 0.49 | 10.0 |
| 7 | 0.08 | 5 | 72 | 160 | 9.0 | 81 | 2360 | 125 | 0.48 | 9.3 |
| 8 | 0.08 | 5 | 48 | 175 | 9.4 | 105 | 2080 | 149 | 0.50 | 10.8 |
| 9 | 0.08 | 5 | 71 | 155 | 9.4 | 118 | 2390 | 126 | 0.52 | 13.2 |
| 10 | 0.08 | 5 | 48 | 175 | 10.9 | 119 | 2305 | 147 | 0.49 | 15.2 |
| 11 | 0.08 | 5 | 49 | 170 | 9.4 | 101 | 2340 | 146 | 0.52 | 9.2 |
| 12 | 0.08 | 5 | 49 | 170 | 9.4 | 101 | 2340 | 146 | 0.52 | 9.2 |
| 13 | 0.08 | 5 | 49 | 170 | 9.4 | 101 | 2340 | 146 | 0.52 | 9.2 |

TABLE 3(2)

| | Lower layer | | | | | | | | | | | | |
|---|---|---|---|---|---|---|---|---|---|---|---|---|---|
| | Component | | | | | Particle properties | | | | | | | |
| Example No. | Particle material | Al wt % | Form of Al content | Si wt % | Moisture content at 100° C. wt % | Major axis diameter μm | Minor axis diameter μm | Aspect ratio | BET m²/g | Crystal size Å | Particle pH | TAP g/cm² | True specific gravity g/cm² | CD g/cm² |
| Comparative Example | | | | | | | | | | | | | | |
| 1 | Fe₂O₃ | | 0 | | 0.15 | 0.025 | | 6 | 55 | 170 | 9 | 0.65 | 5.07 | 1.85 |
| 2 | TiO₂ | | 0 | | | 0.035 | | | 40 | | 7 | | 4.1 | |
| 3 | FeOOH | 35 | 0 | 1.0 | 0.3 | 0.06 | | 5 | 310 | 107 | 9 | 0.46 | 3.38 | 1.45 |
| 4 | FeOOH | 5 | 0 | 1.0 | 0.3 | 0.048 | | 6.3 | 53 | 103 | 9 | 0.45 | 3.58 | 1.45 |
| 5 | FeOOH | 5 | 0 | 1.0 | 0.3 | 0.048 | | 6.3 | 53 | 103 | 9 | 0.45 | 3.58 | 1.45 |
| 6 | FeOOH | 5 | 0 | 1.0 | 0.3 | 0.048 | | 6.3 | 53 | 103 | 9 | 0.45 | 3.58 | 1.45 |
| 7 | FeOOH | 5 | 0 | 1.0 | 0.3 | 0.048 | | 6.3 | 53 | 103 | 9 | 0.45 | 3.58 | 1.45 |
| 8 | FeOOH | 5 | 0 | 1.0 | 0.3 | 0.048 | | 6.3 | 53 | 103 | 9 | 0.45 | 3.58 | 1.45 |

TABLE 3(2)-continued

| | | | | | | | | | | | | | |
|---|---|---|---|---|---|---|---|---|---|---|---|---|---|
| 9 | FeOOH | 5 | 0 | 1.0 | 0.3 | 0.048 | 6.3 | 53 | 103 | 9 | 0.45 | 3.58 | 1.45 |
| 10 | FeOOH | 5 | 0 | 1.0 | 0.3 | 0.048 | 6.3 | 53 | 103 | 9 | 0.45 | 3.58 | 1.45 |
| 11 | FeOOH | 5 | 35 | 1.0 | 0.3 | 0.048 | 6.3 | 181 | 103 | 9 | 0.4 | 3.75 | 1.5 |
| 12 | FeOOH | 5 | 35 | 1.0 | 0.3 | 0.048 | 6.3 | 181 | 103 | 9 | 0.4 | 3.75 | 1.5 |
| 13 | FeOOH | 5 | 35 | 3.5 | 0.3 | 0.048 | 6.3 | 181 | 103 | 9 | 0.4 | 3.75 | 1.5 |

| | Tape properties | | | | | | | | |
|---|---|---|---|---|---|---|---|---|---|
| Example No. | Roughness Å | Strength mg | Hc Oe | Bm G | Br/Bm | Δ Bm % | Output dB | C/N dB | Precipitation after weather test |
| Comparative Example | | | | | | | | | |
| 1 | 152 | 90 | 2300 | 4030 | 0.83 | 3.5 | +4.6 | +4.8 | No |
| 2 | 143 | 80 | 2320 | 4050 | 0.84 | 3.3 | +4.7 | +4.9 | No |
| 3 | | | | | | | Tape can't be formed | | |
| 4 | 110 | 96 | 2010 | 3600 | 0.86 | 6.3 | +3.2 | +2.2 | No |
| 5 | 103 | 101 | 1700 | 4250 | 0.78 | 3.9 | +0.9 | +1.9 | No |
| 6 | 108 | 86 | 1600 | 3800 | 0.75 | 3 | +1.8 | +1.7 | No |
| 7 | 112 | 85 | 2370 | 2800 | 0.74 | 2.9 | +1.7 | +1.6 | No |
| 8 | 103 | 103 | 2100 | 4050 | 0.79 | 2.9 | +2.5 | +2.1 | No |
| 9 | 121 | 84 | 2400 | 2850 | 0.8 | 2.9 | +2.0 | +1.8 | No |
| 10 | 116 | 90 | 2300 | 3750 | 0.74 | 4.2 | Unmeasurable | | Yes |
| 11 | 169 | 80 | 2375 | 4120 | 0.83 | 3 | +3.0 | +3.1 | No |
| 12 | | | | | | | Tape can't be formed | | |
| 13 | | | | | | | Tape can't be formed | | |

From Tables 2 (1,2) and 3 (1,2), it can be seen that the multilayer magnetic recording medium in which α-FeOOH particles are used for the lower layer in accordance with the present invention has excellent strength, surface roughness, electromagnetic conversion characteristics and weather resistance. The improvement in magnetic properties is particularly good when Co, Y and Al are present together in the magnetic metal particles, which also results in the enhanced extraction of magnetic properties by the inventive lower layer.

In comparative example 10 in which the magnetic metal particles for the upper layer have high Na and Ca, dispersion is difficult and even when achieved, the tape has decreased durability and storage stability, with surface crystal precipitation being observed after the tape was left in an atmosphere having a relative humidity of 90% and a temperature of 60° C.

What is claimed is:

1. A magnetic recording medium having a multilayer structure, formed on a substrate, comprising a magnetic layer of magnetic particles dispersed in a resinous binder, and a non-magnetic layer of non-magnetic particles dispersed in a resinous binder, said magnetic particles being composed of acicular ferromagnetic metal particles of Fe containing from more than 5 to 50 at. % Co, 0.1 to 30 at. % Al, 0.1 to 10 at. % rare earth elements (including Y), up to 0.05 wt. % periodic table group 1a elements and up to 0.1 wt. % (including 0 wt. %) periodic table group 2a elements, said non-magnetic particles being composed of acicular particles of α-FeOOH which occuludes 0.1 to 30 wt. % Al, having an atmospheric decomposition starting temperature of 210° C. or above, having an average major axis diameter of 0.01 to 0.5 μm and releasing not more than 2 wt. % of $H_2O$ at 100° C.

2. A magnetic recording medium according to claim 1, wherein said acicular ferromagnetic metal particles have an average major axis diameter of 0.01 to 0.4 μm.

3. A magnetic recording medium according to claim 1, wherein said acicular ferromagnetic metal particles have a BET specific surface area of 30 to 70 $m^2/g$, a crystalline diameter of 50 to 250 angstrom, a coercive force Hc of 1200 to 3000 (Oe) and a saturation magnetic flux density σs of 100 to 200 (emu/g).

4. A magnetic recording medium according to claim 1, wherein said acicular ferromagnetic metal particles are particles that release not more than 2 wt. % $H_2O$ at 100° C. and not more than 4.0 wt. % $H_2O$ at 300° C.

5. A magnetic recording medium according to claim 1, wherein said non-magnetic particles are composed of α-FeOOH containing 0.1 to 30 wt. % Si.

6. A magnetic recording medium according to claim 1, wherein said non-magnetic particles are composed of α-FeOOH and have branches inclined in a prescribed two-dimensional direction.

* * * * *